US008777749B1

(12) United States Patent
Mayeroff

(10) Patent No.: US 8,777,749 B1
(45) Date of Patent: Jul. 15, 2014

(54) GAMING SYSTEM AND METHOD OF OPERATION

(75) Inventor: Jason Mayeroff, Bangkok (TH)

(73) Assignee: Battle Born Gaming, Inc. (SC)

( * ) Notice: Subject to any disclaimer, the term of this patent is extended or adjusted under 35 U.S.C. 154(b) by 1656 days.

(21) Appl. No.: 11/900,277

(22) Filed: Sep. 10, 2007

Related U.S. Application Data

(63) Continuation-in-part of application No. 11/827,574, filed on Jul. 11, 2007, which is a continuation-in-part of application No. 10/815,304, filed on Mar. 31, 2004, application No. 11/900,277, which is a continuation-in-part of application No. 11/804,432, filed on May 18, 2007.

(60) Provisional application No. 60/464,937, filed on Apr. 22, 2003.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .................. 463/42; 463/20; 463/26; 463/32; 463/34; 463/46

(58) Field of Classification Search
USPC .................................. 463/20, 26, 32, 34, 46
See application file for complete search history.

(56) References Cited

U.S. PATENT DOCUMENTS

| | | | | |
|---|---|---|---|---|
| 6,203,429 | B1 * | 3/2001 | Demar et al. | 463/20 |
| 6,336,863 | B1 * | 1/2002 | Baerlocher et al. | 463/27 |
| 6,416,409 | B1 * | 7/2002 | Jordan | 463/27 |
| 7,088,692 | B1 * | 8/2006 | Gronroos | 370/328 |
| 2003/0013516 | A1 | 1/2003 | Walker et al. | |
| 2003/0186739 | A1 * | 10/2003 | Paulsen et al. | 463/25 |
| 2004/0248642 | A1 * | 12/2004 | Rothschild | 463/20 |

* cited by examiner

*Primary Examiner* — Adetokunbo O Torimiro
(74) *Attorney, Agent, or Firm* — Robert Ryan Morishita; Morishita Law Firm, LLC

(57) ABSTRACT

A system for conducting gaming includes at least one gaming machine communicating with an award server. Optionally, the gaming machine communicates with the award server via a network server. In an optional embodiment, the gaming machine includes a bonus selection apparatus with a bonus award display. Bonus award indicia are transmitted from the award server to the bonus selection apparatus, optionally via the gaming machine, for display at the bonus display. A game is conducted at the gaming machine. A determination is made whether a bonus trigger has occurred. In an optional embodiment, the bonus trigger is random; in another optional embodiment, the bonus trigger is based on the outcome of the game. A displayed bonus award indicium is selected in response to a bonus trigger and the bonus award associated with the selected bonus award indicium is issued.

27 Claims, 9 Drawing Sheets

GAMING SYSTEM AND METHOD OF OPERATION

RELATED APPLICATION DATA

The present application is a continuation-in-part of U.S. patent application Ser. No. 11/827,574, entitled "Gaming Device and Method of Issuing a Bonus Award," filed Jul. 11, 2007 by Applicant herein which, in turn, was a continuation-in-part of U.S. patent application Ser. No. 10/815,304, entitled "Gaming Device and Method of Display a Changeable Bonus Value Feature," filed Mar. 31, 2004 by Applicant herein which, in turn, claimed the benefit of U.S. Provisional Patent Application Ser. No. 60/464,937, entitled "Gaming Device and Method of Displaying a Three-Dimensional Bonus Feature," filed Apr. 22, 2003 by Applicant herein. The present application is also a continuation-in-part of U.S. patent application Ser. No. 11/804,432, entitled "Gaming System and Method of Operation," filed May 18, 2007 by Applicant herein.

FIELD OF THE INVENTION

The present invention relates to gaming systems. More particularly, the present invention relates to a system and method of operating a system, in which bonus award data are transmitted for display at a bonus selection apparatus from a remote award server.

BACKGROUND OF THE INVENTION

Gaming machines take many forms, such as video gaming machines which conduct video reel slot machine games or video card games, mechanical slot machines, electronic table games, or the like. However, all these gaming machines issue awards similarly. That is, the awards are issued to the player in currency or a form representing currency.

For example, in a typical gaming machine, currency is deposited into the gaming machine via a bill acceptor, or a voucher representing currency is deposited into the gaming machine via a ticket receiver. The amount deposited is tracked as gaming credits in a credit register in the gaming machine. The game is conducted, with wagers deducted from the credit register and winnings added to the credit register. Upon completing a play session, the player depresses a "cash out" button and the balance in the credit register is provided to the player in the form of cash, coin, or, more commonly, a voucher.

A drawback of cash, coin, or vouchers is the possibility of physical loss of the cash, coin, or voucher. For example, vouchers are not tracked in any way that allows a casino to replace a lost, damaged, or destroyed voucher. As may be appreciated, the physical loss of a voucher representing a large sum of money may be very disconcerting for a player.

For the part of the casino, cash, coin, and vouchers can represent a lost opportunity to get the player to spend the money represented. That is, once the player has "cashed out," the money is very real to the player and he or she may be less likely to participate in further gaming activities.

Additionally, monetary awards have a fixed value to the casino. It is known, for example, that offering prizes in-kind allows the casino to offer a prize that has a greater value to the player than the cost to the casino. For example, Walker, U.S. Patent Application Publication No. US 2003/0013516, discloses a method and apparatus for offering and providing consolation, in-kind prizes based on the player's losses and the player's history of play gleaned from player tracking data.

It can be seen that there is a need in the art for a system and method in which bonus award data are transmitted for display at a bonus selection apparatus from a remote award server.

SUMMARY OF THE INVENTION

A gaming system includes at least one gaming machine. The gaming machine or gaming machines conduct a base game for at least one player according to a predefined set of game rules. The gaming machine includes a game processor including a random number generator. The random number generator generates a random number used, at least in part, to generate an outcome for the base game. The gaming machine also includes a gaming machine communication device in communication with the game processor and a bonus selection apparatus in communication with the game processor. The bonus selection apparatus includes a bonus display that displays bonus award indicia associated with one or more bonus awards.

A gaming system also includes an award server in communication with the bonus selection apparatus. In an optional embodiment, the award server communicates directly with the bonus selection apparatus. In another optional embodiment, the award server communicates with the bonus selection apparatus through the gaming machine, optionally via the gaming machine communication device. Optionally, the award server is an Internet web server in communication with a world wide web of web servers. The gaming machine receives data from the award server. The data include bonus award indicia displayed at the bonus display. Optionally, the award server randomly transmits bonus award indicia for receipt at the bonus selection apparatus and display at the bonus display.

In an optional embodiment, the game processor triggers the bonus selection apparatus to select at least one bonus award indicium and award the bonus award associated with the selected bonus award indicium. In one such optional embodiment, the game processor triggers the bonus selection apparatus in response to a predetermined outcome in the base game. In another optional embodiment, the game processor triggers the bonus selection apparatus randomly.

The present invention also includes a method for operating a gaming system that includes at least one gaming machine conducting a base game and an award server. The gaming machine includes a game processor including a random number generator, a gaming machine communication device in communication with the game processor, and a bonus selection apparatus in communication with the game processor. The bonus selection apparatus includes a bonus display that displays bonus award indicia associated with one or more bonus awards. Specifically, at least one bonus award indicium is received at the bonus selection apparatus. In an optional embodiment, the bonus award indicium is received at the gaming machine and, in turn, transmitted to the bonus selection apparatus. The bonus award indicium or bonus award indicia are displayed at the bonus display. Optionally, the bonus award indicium or bonus award indicia are transmitted randomly from the award server to the bonus selection apparatus.

Optionally, the bonus award indicia displayed at the bonus display are selected at the award server. For example, in one optional embodiment, data representing game outcome is transmitted from the gaming machine to the award server. At least one bonus award available to be issued based, at least in part, on the outcome, is identified. A bonus award indicium associated with the available bonus award is transmitted from the award server to the gaming machine for display at the bonus display.

In another optional embodiment in which a wager is received from the player at the gaming machine, data representing the wager is transmitted from the gaming machine to the award server. At least one bonus award available to be issued based, at least in part, on the wager, is identified. A bonus award indicium associated with the available bonus award is transmitted from the award server to the bonus selection apparatus for display at the bonus display.

In yet another optional embodiment in which the base game includes at least one player-selectable game parameter, a selection of a game parameter is received from the player. Data representing the player-selected game parameter is transmitted from the gaming machine to the award server. At least one bonus award available to be issued based, at least in part, on the player-selected game parameter, is identified. A bonus award indicium associated with the available bonus award is transmitted from the award server to the bonus selection apparatus for display at the bonus display. In one such example applied to a base game in the form of a reel slot game with a plurality of pay lines, the player-selected game parameter is the number of pay lines activated by the player or the wager allocated by the player to one or more pay lines.

In yet another optional embodiment, the gaming machine further comprises an input device in communication with the game processor. In one such optional embodiment, input is received at the game processor via the input device. Data representing the input is transmitted from the gaming machine to the award server. At least one bonus award available to be issued based, at least in part, on the input, is identified. A bonus award indicium associated with the available bonus award is transmitted from the award server to the bonus selection apparatus for display at the bonus display.

Optionally, the award server is an Internet web server in communication with a world wide web of web servers such that the step of transmitting a bonus award indicium from the award server to the bonus selection apparatus includes the award server transmitting packets of data to, and receiving packets of data from, the bonus selection apparatus via the world wide web.

At least one bonus trigger is defined. In one optional embodiment, the bonus trigger is based, at least in part, on an outcome of the base game. In another optional embodiment, the bonus trigger is random.

A base game according to a predefined set of game rules for at least one player to generate an outcome that is determined, at least in part, by a random number generated by the random number generator. In response to a bonus trigger, at least one bonus award indicium is selected at the bonus selection apparatus and a bonus award associated with the bonus award indicium is issued at the gaming machine.

DESCRIPTION

Figure 1:
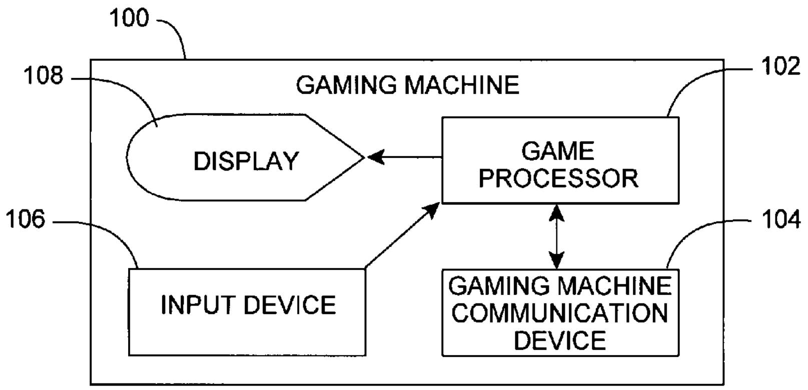
FIG. 1 is a block diagram of a gaming machine according to an embodiment of the present invention.
Figure 2:
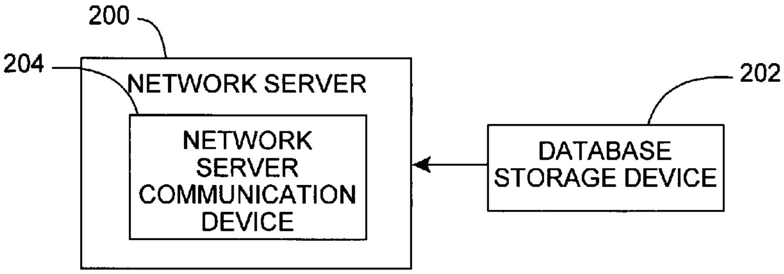
FIG. 2 is a block diagram of a network server according to an embodiment of the present invention.

Reference is now made to the figures wherein like parts are referred to by like numerals throughout. Referring generally to FIGS. 1-14, the present invention is directed to a system and method for conducting gaming. The invention includes one or more gaming machines 100. The gaming machine 100 may take any form. The gaming machine 100 includes a game processor 102 and a gaming machine communication device 104 communicating with, and under the control of, the game processor 102. The game processor 102 operates a random number generator; the random number generator may be hardware, software, an embedded device, a combination thereof, or the like. The gaming machine communication device 104 could take any form, such as a modem, router, hub, network interface card ("NIC") or other device adapted to transmit and receive data. In an optional embodiment, the gaming machine additionally includes an input device 106 communicating with the game processor. The gaming machine may include a display 108, or may communicate with a display.

The gaming machine 100 communicates with an award server 300. In an optional embodiment, the gaming machine 100 may communicate directly to an award server 300 such as through a direct connection. In another optional embodiment, the gaming machine 100 communicates to an award server 300 through a network, such as an intranet, a local area network, a wide area network, a world wide web on the Internet, or other computer network.

For example, referring to FIGS. 2-5, the gaming machine 100 communicates with an award server 300 through a network server 200. More specifically, a gaming machine 100 communicates via a gaming machine communication device 104 to a network server 200 having a network server communication device 204 which, in turn, communicates with an award server 300. As noted above, the network server communication device 204 could take any form, including a modem, NIC, hub, router, or the like. Optionally, the network server 200 includes a network processor (not shown).

Figure 3:
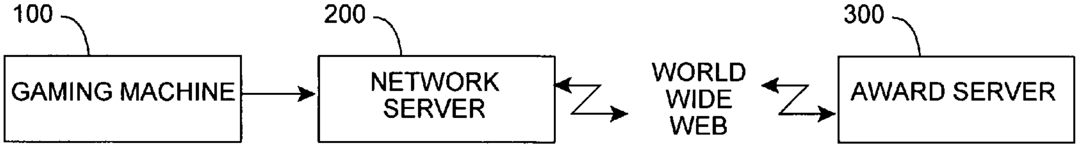
FIG. 3 is a block diagram of a system according to an embodiment of the present invention.
Figure 4:
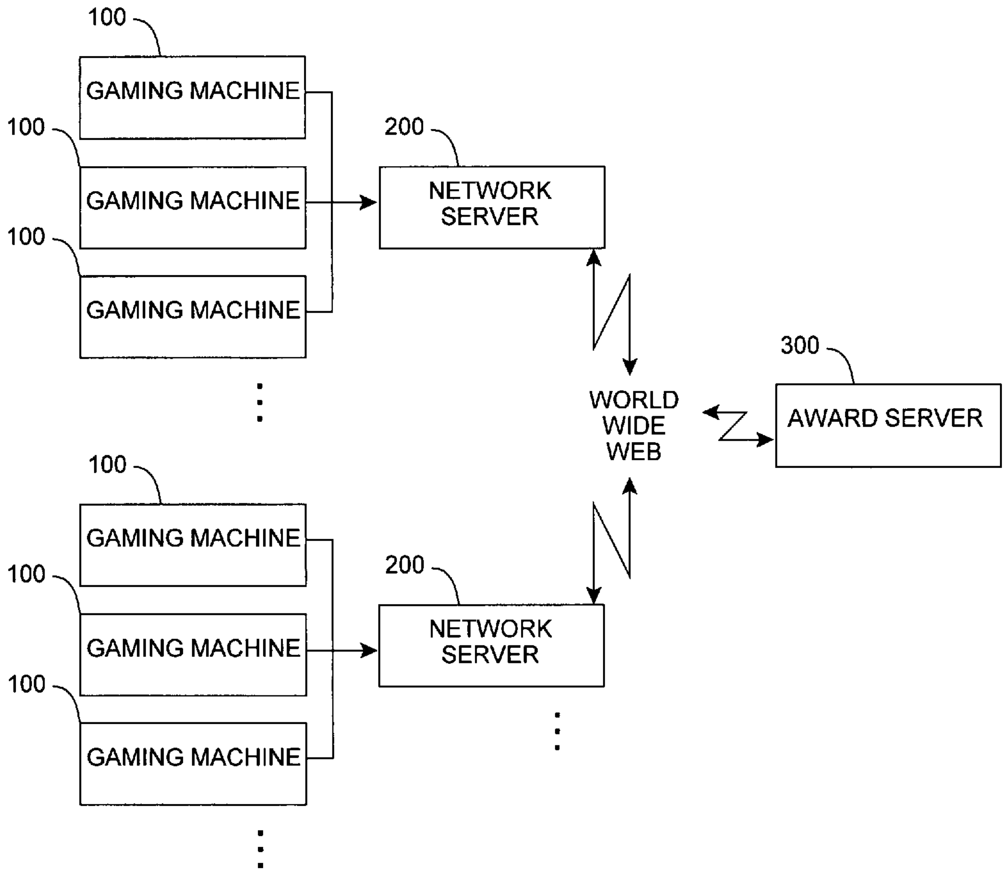
FIG. 4 is a block diagram of a system according to an embodiment of the present invention.

In one optional embodiment, shown in FIGS. 3 and 4, the network server 200 acts as an Internet gateway to a world wide web of web servers on the Internet. In such an optional embodiment, the network server 200 may be local, or may be remote such as at an Internet service provider ("ISP"). In another optional embodiment, shown in FIG. 5, the network server 200 may act locally to coordinate communication between a network of gaming machines 100 and an award server 300. For example, the award server 300 may be a server in an intranet or virtual private network ("VPN") serving a network formed by a plurality of network servers 200.

Returning to FIG. 2, the network server 200 may optionally communicate with a database storage device 202 that stores player records. For example, in an optional embodiment, the player records may be player tracking records (also referred to as player accounts, player rewards accounts, player loyalty accounts, or the like). In one such optional embodiment, the player records may be accessible to the network server 200. In a further optional embodiment, the network server 200 may be permitted to read from, write to, or read from and write to the player records.

Figure 5:
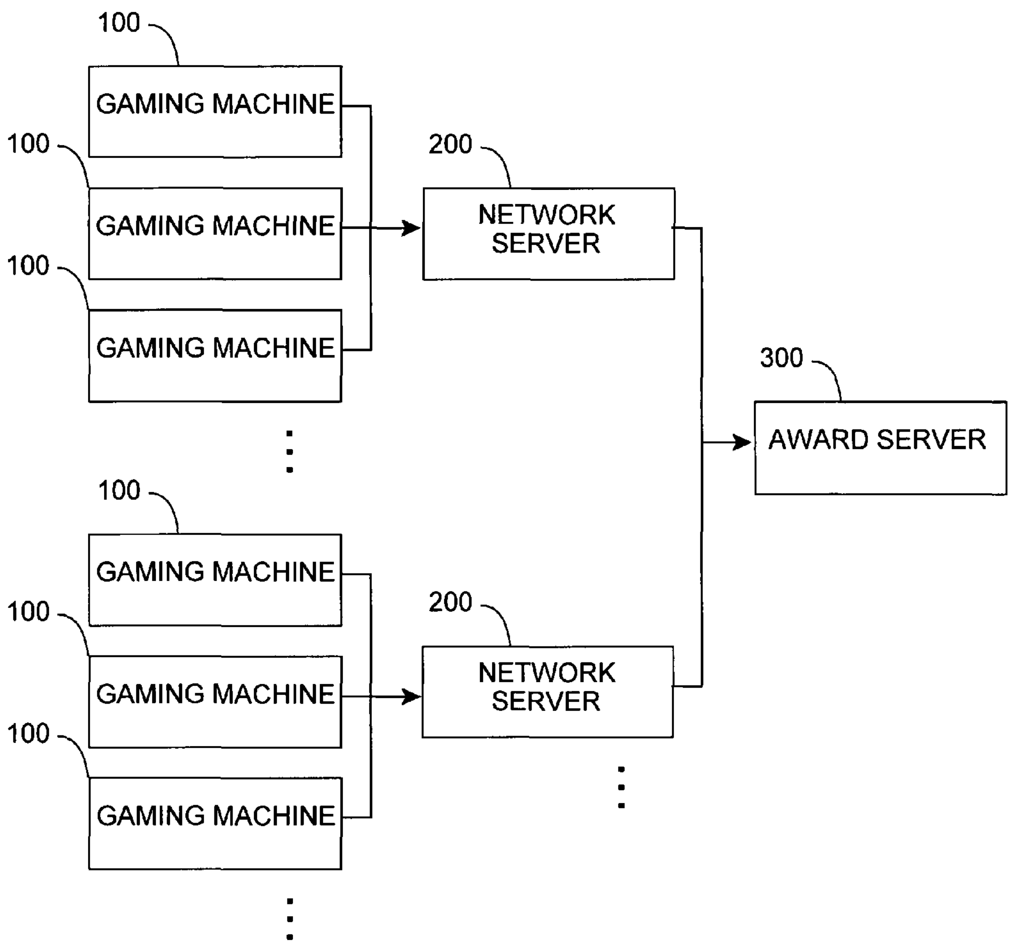
FIG. 5 is a block diagram of a system according to an embodiment of the present invention.

Referring generally to FIGS. 3-5, the award server 300 may take any form. For example, in an optional embodiment, the award server 300 is a web server accessible through a world wide web of web servers on the Internet. Optionally, the award server 300 is a secure web server that is accessible through a predefined security protocol. Alternatively, the award server 300 is an unsecured web server that is openly accessible. In any case, the award server 300 communicates with the gaming machine 100 by transmitting data to, and receiving data from, the gaming machine 100. As described above, the transmission and reception of data at the award server 300 may be conducted directly with the gaming machine 100 or via a network server 200.

Optional embodiments of methods for operating a system are illustrated in FIGS. 6-9. A gaming machine is provided 600, and an award server in communication with the gaming machine is provided 602. As previously discussed, the award server may communicate with the gaming machine directly or via a network server. A game of chance is conducted 604 at a gaming machine for a player. The game is conducted according to a predefined set of game rules. Optionally, the game is of a type in which the outcome of the game is dependent, at least in part, on a random number generated by the random number generator. For example, in a gaming machine conducting a card game, the cards dealt may depend, at least in part, on the output of a random number generator. Similarly, in a gaming machine conducting a reel slot game, the reel symbols displayed may depend, at least in part, on the output of a random number generator.

In any case, an outcome of the game is produced. It is noted that by "outcome," the present invention contemplates any outcome that may be produced in a game. For example, "outcome" may include any occurrence in a game, including a random occurrence, a primary game outcome, or a secondary game outcome that is produced as a result of, contingent upon, or temporally after a primary game outcome is produced. Secondary game outcomes may be produced through such procedures as bonuses for particular outcomes, secondary games, mystery bonuses, random triggers, or any other occurrence apart from the primary game.

Figure 6:
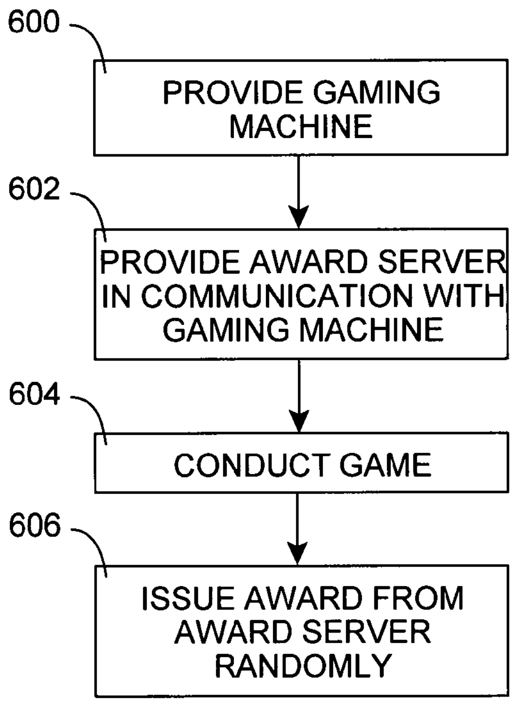
FIG. 6 is a flow chart of a method according to an optional embodiment of the present invention.
Figure 7:
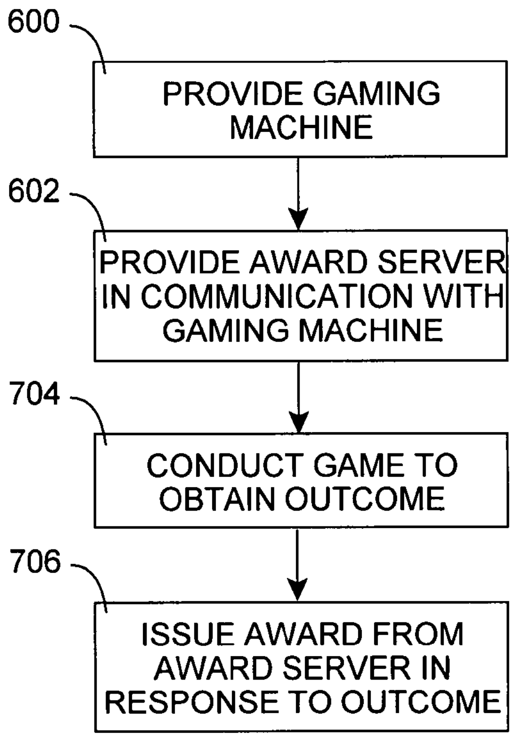
FIG. 7 is a flow chart of a method according to an optional embodiment of the present invention.

In one optional embodiment, shown in FIG. 6, the determination 606 of whether to issue an award from the award server is a random event, i.e. the issuance of an award from the award server is not tied to the outcome of the game. In another optional embodiment, shown in FIG. 7, at least one of the outcomes is associated with an award issued by the award server. The game is conducted to produce 704 an outcome and if the outcome obtained is associated with an award from the award server, the game processor issues 706 the award. It should be noted that in an optional embodiment in which the issuance of an award from the award server depends on an outcome of the game, other outcomes may take many forms, including losing outcomes and winning outcomes that are tied to an award, but not an award from the award server. For example, a certain outcome, such as 7 7 7 reel symbols appearing on a reel slot machine pay line may be associated with an award from the award server, with the remaining outcomes allocated between losing outcomes, such as mixed reel symbols on a pay line, associated with no award and winning outcomes, such as BAR BAR BAR reel symbols on a pay line, associated with a pay out rather than an award from the award server. In another optional embodiment, all outcomes resulting in an award are associated with an award from the award server. In yet another optional embodiment, outcomes may be associated with both an award from the award server and a pay out at the gaming machine. It is noted that in optional embodiments including pay outs, the pay outs could take any form, including machine credits, coin, cash, voucher, or any other form of pay out.

Optionally, the issuance of an award from the award server may occur at a time proximate to the player obtaining the outcome associated with the award, or the issuance of the award may be delayed. Similarly, issuance of an award from the award server may occur after the satisfaction of some threshold criterion, such as the accrual of a predetermined quantity of outcomes associated with the issuance of an award from the award server or a the accrual of a predetermined value of outcomes associated with the issuance of an award from the award server. For example, a player may be issued an award from an award server upon obtaining outcomes associated with an award issued by the award server in, for example, at least three games, or a player may be issued an award from an award server upon obtaining outcomes associated with an award from the award server totaling, for example, at least $20.00.

Figure 8:
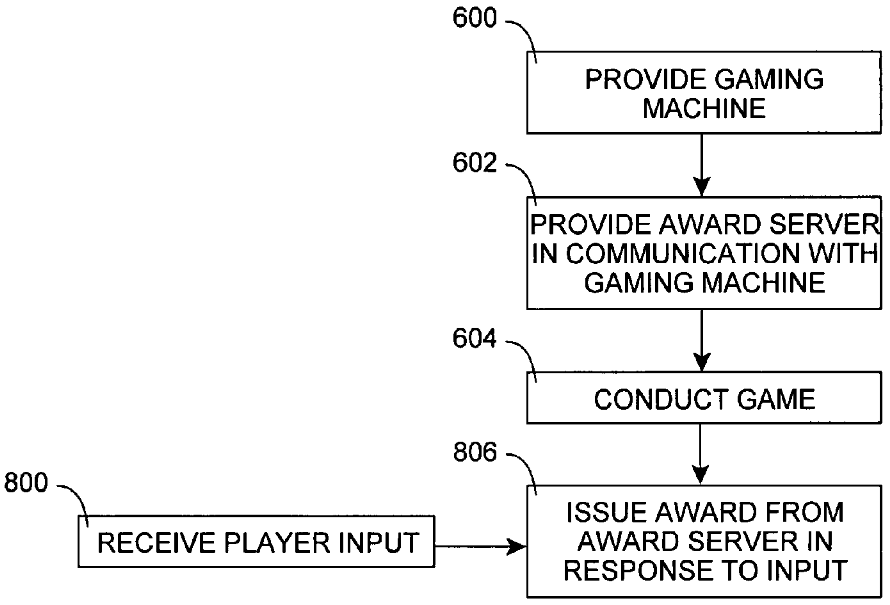
FIG. 8 is a flow chart of a method according to an optional embodiment of the present invention.

In another optional embodiment, shown in FIG. 8, the award server may receive 800 player input via the gaming machine and the issuance 806 of an award from the award server may occur at least partially in response to the input by the player. For example, in an optional embodiment, the issuance of an award from the award server may be selectable by a player. In an example of such an optional embodiment, the player may be given a choice of "cashing out" or being issued an award from the award server. If the player inputs a selection to be issued an award from the award server, the award server issues the award. In a further optional embodiment, the input received may additionally include a selection of the award or awards to be issued by the award server. For example, a player may input a selection to be issued an award from the award server, and additionally input a selection of award A (as distinguished from awards B or C).

In another optional embodiment, outcomes associated with awards from the award server may be "banked" in a player record stored at the database storage device. For example, a player obtaining three outcomes associated with an award from an award server may be allowed to store those outcomes in a player record for access at a later time. Similarly, a player obtaining $20.00 in value in outcomes for an award from an award server may be allowed to store that value in a player record for access at a later time. In an optional embodiment, the player may accrue additional outcomes (either in quantity or in value) over time so that the player with, for example, $20.00 in value toward an award from an award server may be allowed to add to that value at a later time by obtaining additional outcomes associated with awards from the award server.

As noted above, the player record may be maintained strictly for awards from the award server, or may be associated with other data, such as player rewards or player tracking data. In an alternate optional embodiment, the outcomes may be stored and tracked using a real or virtual voucher that can be redeemed at a later time. For example, a player may be issued a code in a physical form (such as a receipt or voucher) or in electronic form (such as in an e-mail) that may permit the player to later request issuance of an award through the award server or, in an optional embodiment, accrual of additional outcomes to the balance associated with the code.

Figure 9:
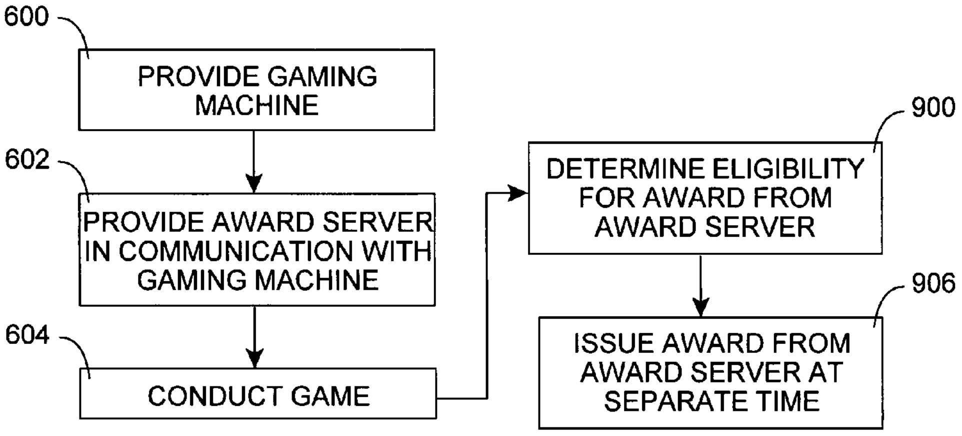
FIG. 9 is a flow chart of a method according to an optional embodiment of the present invention.
Figure 10:
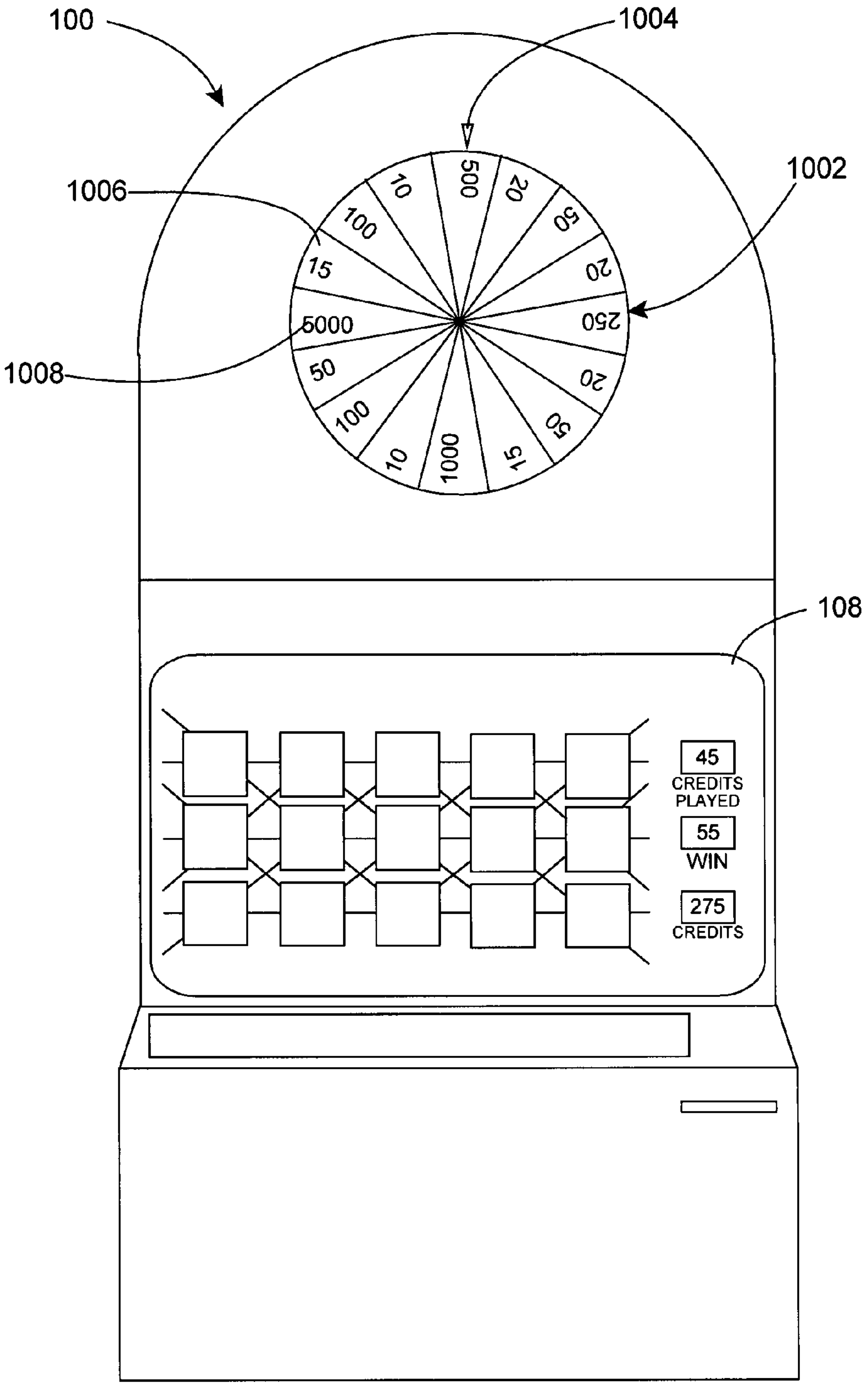
FIG. 10 is a front view of a gaming machine and bonus selection apparatus according to an embodiment of the present invention.

It should be noted that while a the award is issued by the award server as a result of communication from the gaming machine, the player may be permitted to select and prompt issuance of the award apart from the gaming machine, e.g. from a home computer, kiosk, redemption center, or the like. In such an optional embodiment, the step of determining 900 the player to be eligible for an award from the award server through conduct of the game at the gaming machine is separated from the issuance 906 of the award from the award server, which could occur at a separate time and as a result of a communication to the award server from something other than the gaming machine, as shown in FIG. 9.

In a variation on such an optional embodiment, the outcomes associated with an award through the award server may be stored and tracked through a third-party system accessible to the player through the Internet. For example, a third party financial services system may track the quantity or value of outcomes associated with an award from the award server.

Referring generally to FIGS. 6-9, the awards and the issuance of the awards from the award server may take any form. For example, the award may be a good or service. In one such optional embodiment, the player exchanges the outcome for the good or service. In one such optional embodiment, the award server may receive data that at least represents the outcome obtained. Thus, in an example of such an optional embodiment in which the prizes awarded relate to travel, a player with a first outcome may be awarded a discount for an airplane ticket by the award server, a player with a second outcome may be awarded a free airplane ticket to a domestic destination by the award server, and a player with a third outcome may be awarded a free airplane ticket to an international destination by the award server. Optionally, the distinction among the various outcomes would be the expected value of the outcome, e.g. the statistical frequency of the outcome compared to its value, so that, in such an example, the third outcome would occur less frequently than the second outcome, and the second outcome would occur less frequently than the first outcome.

As noted above, the award server may receive data representing input by the player selecting a good or service to exchange for the outcome associated with the award. Thus, in one optional embodiment in which the awards may be segregated by the award server, the award server may determine which awards are available to the player for selection based on the quantity or value of the outcome, and the player may be allowed to select from the available group of awards. Thus, in one example, a player with a first outcome may be limited to selecting from a selection of books, a player with a second outcome may be limited to selecting from a selection of books and CDs, while a player with a third outcome may be allowed to select an award from a selection of books, CDs, and DVDs.

In another optional embodiment, the divisions among awards may be based on the monetary value of the awards. For example, in one such optional embodiment, a player with a first outcome may be limited to selecting from a selection of goods having an award value of up to $20.00, a player with a second outcome may be limited to selecting from a selection of goods having an award value of up to $50.00, and so forth.

In a variation on such an optional embodiment, a player may be allowed to select from a selection of goods each associated with an award value so long as the value of the selected awards is less than the award amount. In an example of such an optional embodiment, a player obtaining a certain outcome may be issued an award of $100.00 in goods by the award server, thereby permitting the player to select up to $100.00 worth of goods.

In yet another variation on such an optional embodiment, a player may be allowed to select a certain quantity of goods from a selection of goods based on the award issued. For example, a player obtaining a first outcome may be permitted to select three CDs, a player obtaining a second outcome may be permitted to select five CDs, and so forth.

In another optional embodiment, the award server receives wager data and outcome data and uses the data to segregate the awards. For example, in one optional embodiment, a player wagering a certain wager amount who obtains an outcome rewarded by the award server may be rewarded with a less valuable award than a player who obtains the same outcome, but wagers a different wager amount. In one optional embodiment, the award varies proportionally with wager amount so that players wagering greater amounts are rewarded with awards having a proportionally greater value. It is noted that wagering data may merely include total wager, or may include such wager parameters as the number of pay lines or hands played, the wager on each pay line or hand, the denomination of the coins, or other wager information, so that such wager parameters may be taken into account in determining which award to issue to a player.

In yet another optional embodiment, the award server receives player data and outcome data and uses the player data to preferentially offer certain awards. In various optional embodiments, the player data received at the award server may be input by the player at the gaming machine or extracted from player records (as described above). For example, in one optional embodiment, the award server may receive player data regarding the player's residence and reward, or offer to reward, the player with awards specific to the player's geographic residence, e.g. events near the player's residence, goods or services obtained from vendors near the player's residence, and the like. In another example, the award server may receive player data regarding the player (such as shopping preferences, gender, age, or the like, and reward, or offer to reward, the player with awards relating to the player data. In any such optional embodiment, the awards may also be segregated by value, so any player data would be combined with wager data and/or outcome data to define a set of one or more awards issued or offered to the player that, optionally, vary with, for example, total wager, pay lines or hands played, wager per pay line or hand, coin denomination, or the like.

In an optional embodiment, the award has some monetary value that can be transferred electronically by the award server. For example, in an optional embodiment, the player exchanges the outcome for a monetary award from the award server. In one such optional embodiment, the award may include the transfer of a monetary award from the award server to a bank account, credit card account, or credit account, to a stored value card (such as a gift card), to an account maintained for the player by the operator of the game (such as the casino or hotel), to a vendor in exchange for goods or services, or the like. In an optional embodiment, the award server may receive data representing input by the player directing how the monetary award is to be transferred (including, in an optional embodiment, where or to whom the transfer occurs). For example, in one such optional embodiment, the input may include an account number, personal identification number ("PIN"), or similar information allowing the player to effect a transfer of the award from the award server directly to the account identified.

Turning, then, to a more concrete example, in an optional embodiment, a player may place a wager to play a game at the gaming machine. The wager may be made in any manner, including allocating the wager from game credits stored at the gaming machine or depositing the wager through a wager handling device in the form of currency, voucher, printed ticket, stored value card, or the like.

The game is conducted for the player according to a predefined set of game rules. The game may take any form, including a card game, a reel slot game, a tile game, dice game, a roulette game, or any other game in which the outcome is determined, at least in part, by a randomly determined event at the game processor in the gaming machine. The game produces an outcome. For example, an outcome could be a hand of cards, arrangements of slot reel symbols on defined pay lines, or the like, depending on the game. Similarly, the outcome could be a secondary game outcome such as a bonus screen, secondary game, wheel game, or other type of bonus game or bonus selection process.

A determination is made whether to issue an award from the award server. In one optional embodiment, the determination is made independent of the outcome. That is, in such an optional embodiment, the determination is made randomly in a way that is separate from the outcome. In such an optional embodiment, the player becomes eligible to have an award issued from the award server in a random fashion.

In another optional embodiment, the determination is made in response to an outcome obtained in the game. Thus, in such an optional embodiment, a player obtaining a particular outcome, such as a particular hand of cards, or a particular arrangement of slot reel symbols, or the like, may be eligible to receive an award from the award server.

In an optional embodiment, the gaming machine communicates through the network server to the award server that an award is to be issued from the award server. Again, as discussed above, this may occur automatically or upon input from the player. Similarly, as discussed above, this may occur immediately or may be delayed or may occur on demand from the player. As noted above, the actual transmission of the communications between the gaming machine and the award server via the network server may be conducted via the world wide web on the Internet, through an intranet, or other computer network.

In an optional embodiment, the gaming machine includes a display that is generated in response to data received from the award server directly or via a network server. For example, the display may display the award issued by the award server. In an optional embodiment in which the award is issued in response to input received from the player via an input device, the display may include award options, delivery options, or the like. The player may input the player's selection through the input device. The input is received at the award server and the award is issued in conformity with the input.

For example, in one such optional embodiment, a player may be presented with a display listing award options, such as books, CDs, DVDs, or like awards offered by the award server, as well as delivery options, such as delivery to the hotel, delivery to the player's home, or like delivery options. The player inputs his or her selections at the gaming machine, for example, a book on casino gambling delivered to the player's house, and the selections are received at the award server so that the award can be issued accordingly.

In another example of such an optional embodiment, a player may be presented with a display informing the player of an award having a monetary value and options for receiving the monetary value, such as deposit to a bank account, payment to a credit line or credit account, credit to the player's hotel bill, deposit to a stored value card, cash-out, or the like. If the player inputs certain selections, such as a transfer to a bank account, credit line or credit account, or hotel bill, the player may be prompted for additional input such as the player's bank account number and bank routing number, credit account number, hotel room number, or the like. The input is received at the award server and the award is issued.

In another optional embodiment, awards may be segregated. The award server determines which award or awards for which the player may be eligible. In one optional embodiment, the determination is random; in another optional embodiment, the award server receives data, such as player data, outcome data, wager data, or other data, and determines which award or awards are available to the player based, at least in part, on the data received. For example, such factors affecting the eligibility for certain prizes may include the outcome obtained by the player, the wager by the player, the wager history of the player, personal information about the player (e.g. age, gender, geographic residence, or the like), or other information. It is noted that the data may be received from the gaming machine or through input at the gaming machine or from some other source, such as player records stored at a database. The award or awards available to the player may be issued, or the player may be allowed to enter a selection of the award.

As previously discussed, the issuance of certain awards may include the receipt of input from a player at the gaming machine that is transmitted to the award server. For example, in an optional embodiment, the award may include the transfer of an award from the award server to an account (such as bank account, credit card account, credit account, deposition account, stored value card, or the like) at a third party financial server. In one such optional embodiment, a method may include receiving account data as input at the gaming machine, and transmitting the account data to the award server to effect the transfer of the award from the award server to the third party financial server. For example, a player may be prompted to enter an account number, PIN, or other identifying data used at the award server to transfer the award to the designated account. In an optional embodiment, the transfer may be effected through an electronic funds transfer, credit transaction, or similar electronic transaction.

As noted above, in an optional embodiment, the present invention may also be directed to bonus awards in addition to, or in place of, base game awards. For example, as shown in FIGS. 10-13, in one optional embodiment, a bonus selection apparatus 1002 may be provided. The bonus selection apparatus 1002 may take any form. For example, in one optional embodiment, the bonus selection apparatus 1002 is a wheel, reel, sphere, or similar device that is rotatable or movable with respect to an indicator 1004 that identifies a selected segment. Similarly, in another optional embodiment, the bonus selection apparatus 1002 is a light board, display, or similar device in which a frame or highlight (not shown) identifies a selected segment.

The bonus selection apparatus 1002 includes a bonus display. The bonus display 1006 includes a display of bonus award indicia 1008 associated with bonus awards selectable by the bonus selection apparatus 1002. For example, in one optional embodiment in which the bonus selection apparatus 1002 includes a rotatable bonus display 1006 with the bonus award indicia 1008 displayed in segments on the rotatable bonus display 1006. In another optional embodiment, the bonus selection apparatus may include a stationary bonus display 1006 with the bonus award indicia 1008 arrayed proximate to a movable indicator 1004.

With continued reference to FIGS. 10-13, the bonus display 1006 is changeable based on bonus award indicia 1008 transmitted from an award server 300. That is, at least one bonus award indicium 1008 is received at the bonus selection apparatus 1002 from the award server 300. In this regard, the award server 300 may communicate with the bonus selection apparatus 1002 directly or, as shown in FIGS. 10-13, via the game processor 102. The bonus award indicia 1008 are displayed at the bonus display 1006 at the bonus selection apparatus 1002.

The selection of bonus award indicia 1008 for display at the bonus display 1006 may be random, or may be based on one or more factors. For example, in one optional embodiment, wager data are transmitted from the game processor 102 of the gaming machine to the award server 300, and the award server 300 selects available bonus awards based, at least in part, on the wager data and transmits the bonus award indicia 1008 associated with those available bonus awards to the bonus selection apparatus 1002, optionally via the gaming machine, for display at the bonus display 1006. Thus, in one such optional embodiment, the bonus award indicia 1008 appearing at the bonus selection apparatus 1002 could depend, at least in part, on the player's wager size, wager denomination, or the like.

In another example, the bonus award indicia 1008 displayed at the bonus selection apparatus 1002 may depend on an outcome generated in the base game. In one such example, outcome data are transmitted from the gaming machine 100 to an award server 300. The award server 300 selects available bonus awards based, at least in part, on an outcome in the base game, and transmits bonus award indicia 1008 associated with those available bonus awards to the bonus selection apparatus 1002, e.g. directly or via the gaming machine 100, for display at the bonus display 1006.

In yet another example, the bonus award indicia 1008 displayed at the bonus selection apparatus 1002 depend on a player-selected parameter in the base game. Examples of such player-selected parameters would depend on the base game and could include such parameters as the number of active pay lines or the wager allocation to one or more pay lines in a reel slot game, the number of active card hands in a card game, or the like. In such an optional embodiment, data representing the player-selected parameter are transmitted to an award server 300 which, in turn, selects available bonus awards based, at least in part, on the player-selected parameter. Bonus award indicia 1008 associated with the available bonus awards are transmitted to the bonus selection apparatus, e.g. directly or via the gaming machine 100, for display at the bonus display 1006.

Figure 11:
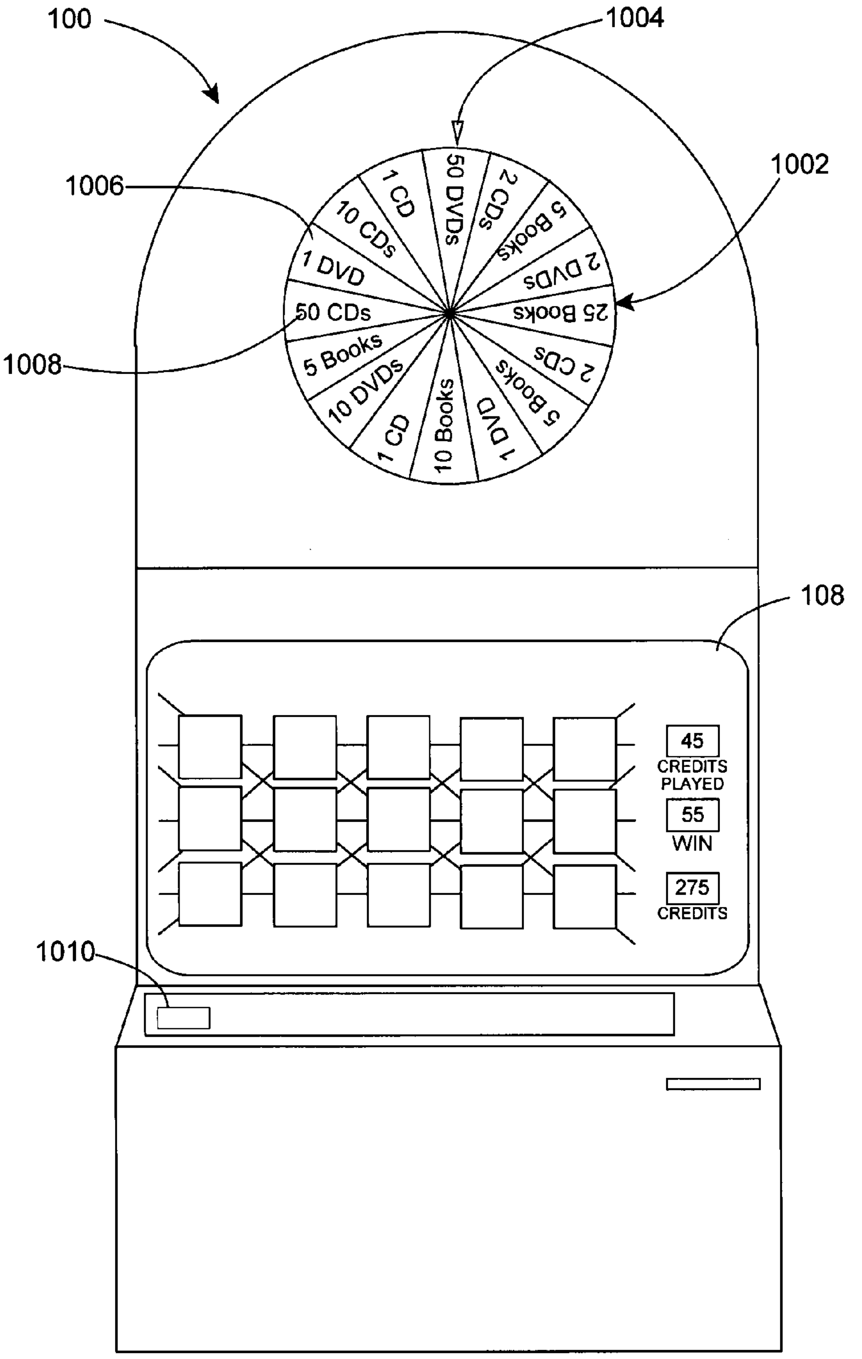
FIG. 11 is a front view of a gaming machine and bonus selection apparatus according to an embodiment of the present invention.
Figure 12:
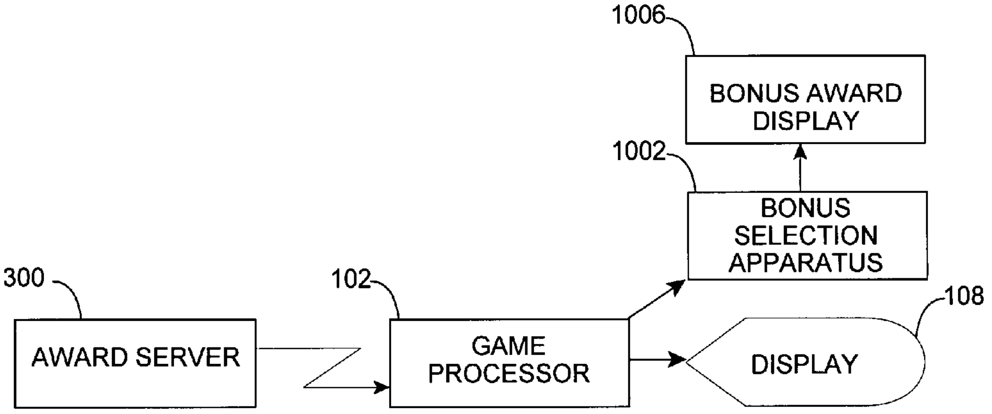
FIG. 12 is a block diagram of a system according to an embodiment of the present invention.
Figure 13:
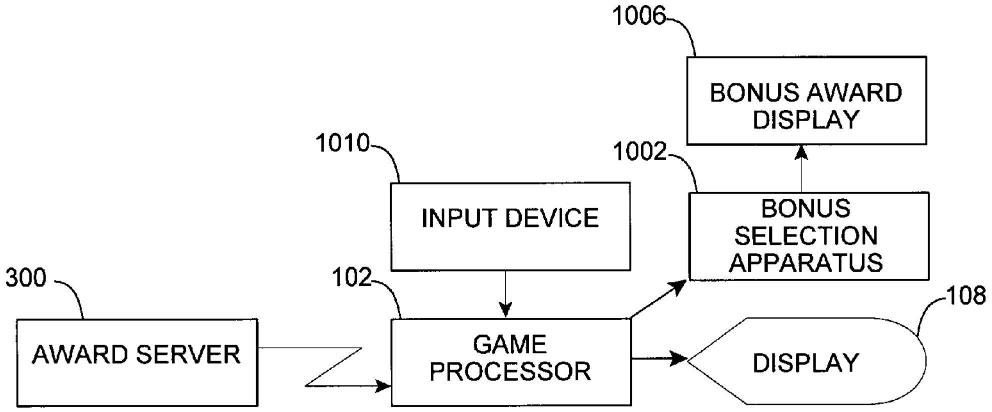
FIG. 13 is a block diagram of a system according to an embodiment of the present invention.

In another example shown in FIGS. 11 and 13, the bonus award indicia 1008 displayed at the bonus display 1006 of the bonus selection apparatus 1002 are selected by an award server 300 based on input from the player. In one such optional embodiment, the gaming machine 100 includes an optional input device 1010 communicating with the game processor 102. Input is received from the player through the input device 1010 and transmitted to the award server 300. The award server 300 selects available bonus awards based, at least in part, on the input. Bonus award indicia 1008 associated with the available bonus awards are transmitted to the bonus selection apparatus 1002, e.g. directly or via the gaming machine 100, for display at the bonus display 1006.

In such an optional embodiment, the input may take many different forms. For example, in one optional embodiment, the input may relate directly to the type or form of the bonus awards for which the player wishes to play. Thus, in one example, the gaming machine 100 or award server 300 may present a player with a selection of different categories of prizes, such as books, DVDs, CDs, travel awards, event tickets, or other categories. In one such optional embodiment, the player selects a category of prize using the input device 1010. The award server 300 selects bonus awards from the selected category and transmits bonus award indicia 1008 to represent the available bonus awards on the bonus display of the bonus selection apparatus 1002.

As discussed in greater detail below, and with reference generally to FIG. 14, a method according to an embodiment of the present invention includes populating a bonus selection apparatus with bonus award indicia from an award server. That is, a bonus selection apparatus includes a bonus display displaying a plurality of bonus award indicia. The bonus awards associated with the bonus award indicia could take any form, such as tangible prizes, nominal-value incentives, game credit awards, free spins, or any other form of award. As discussed in greater detail below, the bonus award indicia displayed at the bonus selection apparatus represent the bonus awards available for the player to win. In an optional embodiment, a second step of bonus selection is required before an available bonus award is issued to the player.

The bonus award indicia populating the bonus display are transmitted from an award server. In an optional embodiment, the bonus award indicia are selected from an inventory of bonus awards. In such an optional embodiment, the bonus award indicia selected for the bonus display may be selected in any manner. For example, in one optional embodiment, the bonus award indicia are selected randomly. That is, in one optional embodiment, bonus award indicia associated with a random selection of bonus awards are transmitted to the bonus display.

In another optional embodiment, the bonus award indicia are selected based on one or more factors. For example, in one optional embodiment, a factor could include a characteristic of the wager placed such as the size of the wager, the denomination of the wager, the way the wager is allocated to propositions in the game, or other wager characteristics. In this manner, the bonus awards available to a player who triggers a bonus selection may vary depending on the player's wager or handling of the player's wager.

In another example, a factor could include the outcome of the wagering game. Thus, in such an optional embodiment, the bonus awards available and the bonus award indicia displayed could vary depending on the outcome in a game or series of games.

In yet another optional embodiment, a factor could include one or more player-selectable game parameter. The player-selectable game parameter could vary depending on the game. For example, in a reel slot game the number of active pay lines may be selectable by the player. Similarly, in a card game, the number of active hands may be selectable by the player. Player-selectable game parameters could also include player selections made during game play. For example, in a card game, the number of cards held or discarded, the number of hole (or community) cards used to form a hand, the number of additional cards taken in Blackjack or Baccarat, the rank of a sub-hand in Pai Gow or Pai Gow Poker, or any other player selection that may occur in the course of a game. In these examples, the bonus award indicia displayed at the bonus selection apparatus could depend on game parameter selected by the player, so that the bonus awards available to be awarded may depend on the player's conduct of the game.

In yet another optional embodiment in which the gaming machine includes an input device, the bonus award indicia selected for display at the bonus selection apparatus may vary depending on input received from the player and transmitted to the award server. The input and selection based on the input may vary depending on the particular embodiment. It is contemplated that the input could include any form of input, such as a selection of a category, size, preference, type, or other characteristic of a bonus award. For example, in one optional embodiment, the input includes a selection of a category of bonus awards and the bonus award indicia displayed at the bonus selection apparatus may come from the selected category. Thus, in one example, a player may be presented with categories of "Entertainment" and "Travel." The award server may transmit bonus award indicia representing show tickets, DVDs, CDs, and books if the player selects the "Entertainment" category or bonus award indicia representing airplane tickets and hotel vouchers if the player selects the "Travel" category. Such an example would allow a player to select the type of prizes the player wishes to play for.

Figure 14:
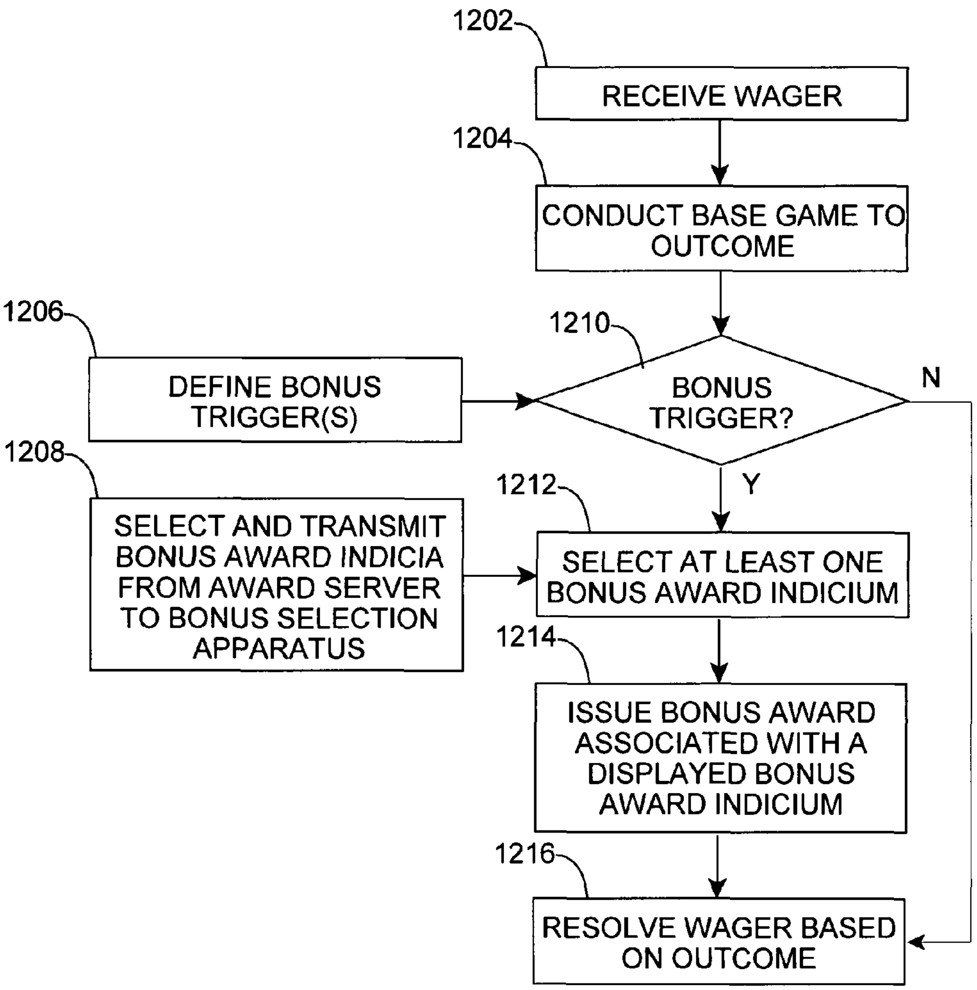
FIG. 14 is a flow chart of a method according to an optional embodiment of the present invention.

With continued reference to FIG. 14, an embodiment of the present method includes a base game. It is contemplated that the selection and transmission 1208 of bonus award indicia from the award server for display at the bonus selection apparatus may occur before, after, or during the conduct 1204 of a base game. Similarly, it is contemplated that a selection and display of bonus award indicia may be refreshed with each base game, may persist over several base games, may be refreshed upon request by the player, may be refreshed randomly, or may be altered, renewed, changed, or refreshed in any other manner. In yet another optional embodiment, bonus award indicia may be refreshed singly or in series rather than in a group. For example, as a bonus award indicium is selected, it may be removed from the bonus display at the bonus selection apparatus and replaced with another bonus award indicium.

Optionally, a base game is conducted 1204 in response to the receipt 1202 of a wager from a player. The base game is conducted 1204 to generate an outcome. In an optional embodiment, the outcome may take the form of a winning outcome, a losing outcome, or, in certain games, a push outcome. The wager is resolved 1216 based, at least in part, on the outcome in the base game.

A bonus selection occurs in response to a bonus trigger 1210. In an optional embodiment, it is contemplated that certain criteria may need to be satisfied for a bonus trigger to occur. For example, a player may be required to place a minimum wager in the base game or place a separate bonus wager to be eligible to trigger a bonus.

The bonus trigger could be defined 1206 in many different ways. For example, a bonus trigger could occur randomly. That is, the bonus trigger may occur independent of the base game. In a further optional embodiment, the bonus trigger may be contingent on an additional criterion or criteria, such as a minimum wager size, so that the bonus trigger occurs randomly only in those games where the additional criterion or criteria are met.

In another optional embodiment, the bonus trigger may depend, at least in part, on the outcome of the base game. That is, in one such optional embodiment, a designated outcome may trigger a bonus. The outcome triggering the bonus may vary depending on the game. For example, the outcome triggering a bonus may be a winning outcome, a losing outcome, an outcome with a designated combination of reel symbols or cards, an outcome with a designated pattern of symbols or cards, a series of designated outcomes over a series of base games, or the like.

A bonus selection includes randomly selecting 1212 at least one bonus award indicium from among the bonus award indicia displayed at the bonus selection apparatus. It is contemplated that the bonus selection may take any form. In certain optional embodiments, the bonus selection may depend on the form of the bonus selection apparatus.

For example, in the figures, the bonus selection apparatus may take the form of a wheel with bonus award indicia displayed on segments of the wheel and an indicator. In such an optional embodiment, a bonus trigger could cause the wheel to move relative to the indicator. In one such optional embodiment, a bonus award indicium is selected when the segment on which the bonus award indicium is displayed aligns with the indicator when the relative motion stops.

The bonus award associated with the selected bonus award indicium is issued 1214 to the player. The bonus award may be issued at the gaming machine. For example, certain bonus awards such as game credits, coupons, vouchers, cash, tangible prizes, or the like may be delivered at the gaming machine. In another optional embodiment, certain bonus awards may not be delivered at the gaming machine. For example, in an optional embodiment in which the bonus awards include tangible objects, the bonus award may be delivered to the player's hotel room or other physical address. As discussed above with respect to another optional embodiment, the player may enter an address or other contact information, e.g. electronic mail address, telephone or facsimile number, or the like, so that the bonus award may be delivered to the player.

Similarly, in an optional embodiment, a selection by the player may be received at an award server, such as through an input device at the gaming machine. For example, if the bonus award indicium selected by the bonus selection apparatus is "10 Books," the player may input a selection of ten titles that the player wishes to receive. Similarly, if the bonus award indicium selected by the bonus selection apparatus is "1 Airline Ticket," the player may input a selection, such as a flight destination, flight date, airline, or the like, and the award server may issue or arrange the issuing of the bonus award taking into account the selection input, to the extent possible. The award server may direct the issuing of the award, such as through arranging delivery of the bonus award, arranging the ordering of the bonus award on behalf of the player, issuing a certificate redeemable for the selected bonus award, or the like.

While certain embodiments of the present invention have been shown and described it is to be understood that the present invention is subject to many modifications and changes without departing from the spirit and scope of the invention presented herein.

I claim:

1. A gaming system comprising:

at least one gaming machine adapted to conduct a base game according to a predefined set of game rules for at least one player comprising:

a game processor including a random number generator, said random number generator adapted to generate a random number used, at least in part, to generate an outcome for said base game;

an input device in communication with said game processor;

a gaming machine communication device in communication with said game processor; and a bonus display in communication with said game processor, said bonus display adapted to display a plurality of bonus award indicia associated with one or more bonus awards; and an award server separate from said game processor and operating independently from said game processor, said award server being in communication with said bonus display and said award server being the sole source of bonus award indicia for display on said bonus display, wherein said award server and game processor execute program instructions to (a) receive player input including non-wagering data through said input device and communicate said player input from said game processor to said award server, (b) dynamically select by said award server at least one bonus award indicia for display at said bonus display, wherein said at least one bonus award indicia selected for display at said bonus display is selected by said award server at least partially in response to said player input and is changeable by said award server in response to changes in said player input, (c) display said at least one bonus award indicia received from said award server at said bonus display, and (d) select at least one bonus award indicium by said game processor from among the bonus award indicia displayed on said bonus display in response to a trigger and issue the bonus award associated with the selected bonus award indicium.

2. The gaming system of claim 1 wherein said gaming machine is adapted to communicate with said award server through said gaming machine communication device such that said bonus display is adapted to receive said at least one bonus award indicium through said gaming machine.

3. The gaming system of claim 1 wherein said award server is adapted to randomly transmit bonus award indicia for receipt at said gaming machine and display at said bonus display.

4. The gaming system of claim 1 wherein said game processor is adapted to select a bonus indicium in response to a predetermined outcome in said base game.

5. The gaming system of claim 1 wherein said game processor is adapted to select a bonus indicium randomly.

6. The gaming system of claim 1 wherein said award server is an Internet web server in communication with a world wide web of web servers.

7. The gaming system of claim 1 wherein said gaming machine is adapted to transmit data representing said outcome to said award server and said award server is adapted to identify at least one bonus award available to be issued based, at least in part, on said outcome and transmit a bonus award indicium associated with said available bonus award to said bonus display for display at said bonus display.

8. The gaming system of claim 1 wherein said gaming machine is adapted to receive a wager and transmit data representing said wager to said award server and said award server is adapted to identify at least one bonus award available to be issued based, at least in part, on said wager and transmit a bonus award indicium associated with said available bonus award to said bonus display for display at said bonus display.

9. The gaming system of claim 1 wherein a plurality of said bonus awards are game credit awards stored at said award server and said award server is adapted to identify a plurality of bonus awards available to be issued and transmit a plurality of bonus award indicia associated with said available bonus awards to said bonus display for display at said bonus display.

10. The gaming system of claim 9 wherein said bonus display is changeable and said award server is adapted to refresh periodically at least one of said bonus award indicia to vary said game credit award periodically.

11. The gaming system of claim 9 wherein said bonus display is changeable and said award server is adapted to refresh continuously at least one of said bonus award indicia to vary said game credit award continuously.

12. The gaming system of claim 9 wherein said bonus display is changeable and said award server is adapted to refresh randomly at least one of said bonus award indicia to vary said game credit award randomly.

13. The gaming system of claim 9 wherein said bonus display is changeable and said award server is adapted to refresh at least one of said bonus award indicia with each base game conducted to vary said game credit award with each base game conducted.

14. The gaming system of claim 9 wherein said bonus display is changeable and said award server is adapted to refresh at least one of said bonus award indicia independent of the conduct of said base game to vary said game credit award independent of the conduct of said base game.

15. The gaming system of claim 9 further comprising an input device in communication with said game processor wherein said bonus display is changeable and said award server is adapted to refresh at least one of said bonus award indicia upon receiving a request by said player through said input device to vary said game credit award upon receiving a request by said player.

16. A method for operating a gaming system comprising:

providing at least one gaming machine conducting a base game comprising:

a game processor including a random number generator;

an input device in communication with said game processor;

a gaming machine communication device in communication with said game processor; and a bonus display configured to display a plurality of bonus award indicia associated with one or more bonus awards;

providing an award server in communication with said bonus selection apparatus, said award server separate from said game processor and operating independently from said game processor;

receiving player input including non-wagering data through said input device and communicating said player input from said game processor to said award server;

dynamically selecting by said award server at least one bonus award indicia for display at said bonus display, wherein said at least one bonus award indicia selected for display at said bonus display is selected by said award server at least partially in response to said player input and is changeable by said award server in response to changes in said player input;

receiving said at least one bonus award indicium from said award server at said bonus display, wherein said award server is the sole source of bonus award indicia for display on said bonus display;

displaying said at least one bonus award indicium at said bonus display;

defining at least one bonus trigger;

conducting said base game according to a predefined set of game rules for at least one player to generate an outcome, said outcome determined, at least in part, by a random number generated by said random number generator; and in response to said bonus trigger, selecting at least one bonus award indicium from among the bonus award indicia displayed at said bonus display and issuing a bonus award associated with said selected bonus award indicium at said gaming machine.

17. The method of claim 16 wherein said step of receiving at least one bonus award indicium from said award server at said bonus display includes receiving at least one bonus award indicium at said gaming machine through said gaming machine communication device and, in turn, receiving said at least one bonus award indicium at said bonus display through said gaming machine.

18. The method of claim 16 wherein said award server randomly transmits bonus award indicia for receipt at said gaming machine and display at said bonus display.

19. The method of claim 16 wherein said bonus trigger occurs, at least in part, in response to a predetermined outcome in said base game.

20. The method of claim 16 wherein said bonus trigger occurs randomly.

21. The method of claim 16 further comprising:

transmitting data representing said outcome from said gaming machine to said award server;

identifying at least one bonus award available to be issued based, at least in part, on said outcome; and transmitting a bonus award indicium associated with said available bonus award from said award server to said gaming machine for display at said bonus display.

22. The method of claim 16 further comprising:

receiving a wager from said player at said gaming machine;

transmitting data representing said wager from said gaming machine to said award server;

identifying at least one bonus award available to be issued based, at least in part, on said wager; and transmitting a bonus award indicium associated with said available bonus award from said award server to said gaming machine for display at said bonus display.

23. The method of claim 16 wherein said base game includes at least one player-selectable game parameter, said method further comprising:

receiving from said player a selection of a game parameter;

transmitting data representing said player-selected game parameter from said gaming machine to said award server;

identifying at least one bonus award available to be issued based, at least in part, on said player-selected game parameter; and transmitting a bonus award indicium associated with said available bonus award from said award server to said gaming machine for display at said bonus display.

24. The method of claim 23 wherein said base game is a reel slot game with a plurality of pay lines and said player-selected game parameter is the number of pay lines activated by said player.

25. The method of claim 23 wherein said base game is a reel slot game with a plurality of pay lines and said player-selected game parameter is the wager allocated to one or more pay lines by said player.

26. The method of claim 16 wherein said gaming machine further comprises an input device in communication with said game processor, said method further comprising:

receiving input at said game processor via said input device;

transmitting data representing said input from said gaming machine to said award server;

identifying at least one bonus award available to be issued based, at least in part, on said input; and transmitting a bonus award indicium associated with said available bonus award from said award server to said gaming machine for display at said bonus display.

27. The method of claim 16 wherein said award server is an Internet web server in communication with a world wide web of web servers such that said step of transmitting a bonus award indicium from said award server to said gaming device includes said award server transmitting packets of data to, and receiving packets of data from, said gaming machine via said world wide web.

* * * * *